US012427692B2

(12) United States Patent
Wang et al.

(10) Patent No.: US 12,427,692 B2
(45) Date of Patent: Sep. 30, 2025

(54) DUST COUPLER ADAPTED TO DIFFERENT DUST OUTLET TUBES

(71) Applicant: Hui-Chuan Liao, Oakland, CA (US)

(72) Inventors: Chun-Ti Wang, Taichung (TW); Yin-Liang Liao, Taichung (TW); Ching-Hsuan Chiu, Taichung (TW); Hui-Chuan Liao, Oakland, CA (US)

(73) Assignee: Hui-Chuan Liao, Oakland, CA (US)

( * ) Notice: Subject to any disclaimer, the term of this patent is extended or adjusted under 35 U.S.C. 154(b) by 355 days.

(21) Appl. No.: 18/184,917

(22) Filed: Mar. 16, 2023

(65) Prior Publication Data

US 2024/0308101 A1 Sep. 19, 2024

(51) Int. Cl.
*B27G 3/00* (2006.01)

(52) U.S. Cl.
CPC .................................... *B27G 3/00* (2013.01)

(58) Field of Classification Search
CPC .. B27G 3/00; F16L 37/28; F16L 27/12; F16L 27/10; F16L 27/1021; F16L 21/02; A47L 9/02; A47L 9/242; A47L 9/24; A47L 9/127; A47L 9/248; A47L 7/0095
USPC .......................................................... 15/246
See application file for complete search history.

(56) References Cited

U.S. PATENT DOCUMENTS

| | | | | |
|---|---|---|---|---|
| 2,201,372 A * | 5/1940 | Miller | F16L 37/0845 | 285/337 |
| 2007/0075542 A1* | 4/2007 | Glaze | F16L 25/01 | 285/322 |
| 2021/0071793 A1* | 3/2021 | Kluss | B25B 27/10 | |

* cited by examiner

*Primary Examiner* — Katina N. Henson
(74) *Attorney, Agent, or Firm* — RABIN & BERDO, P.C.

(57) ABSTRACT

A dust coupler adapted to different dust outlet tubes has a collecting pipe connector and an elastic sheathing element. The collecting pipe connector has a first end and a second end being opposite to each other. The first end is configured to be inserted into a collecting pipe of a dust collection system for woodworking. The elastic sheathing element is connected to the second end of the collecting pipe connector, has a mouth, and is configured to be elastically sheathed onto a dust outlet tube of a woodworking machine. A woodworker first mounts the dust coupler on the collecting pipe, and the collecting pipe can be combined with any one of different dust outlet tubes of different woodworking machines having different sizes via the dust coupler. The dust coupler allows the collecting pipe to be quickly combined with or detached from the dust outlet tube.

12 Claims, 6 Drawing Sheets

DUST COUPLER ADAPTED TO DIFFERENT DUST OUTLET TUBES

BACKGROUND OF THE INVENTION

1. Field of the Invention

The present invention relates to a dust collection system for woodworking, and particular to a dust coupler adapted to different dust outlet tubes.

2. Description of Related Art

A dust collection system is disposed in a workspace of woodworking to collect sawdust produced by processing wood, which protects woodworkers' respiratory systems from negative effects. A dust collection system has a dust collector and a collecting pipeline, and each one of multiple woodworking machines in the workspace normally has a dust outlet tube for discharging sawdust collected inside the woodworking machine. The collecting pipeline connects the dust collector and the dust outlet tube of each one of the multiple woodworking machines, which allows the sawdust to discharge from the dust outlet tube to be collected to the dust collector.

A collecting pipe of the collecting pipeline is combined with the dust outlet tube via a dust coupler. Since the dust outlet tubes of different woodworking machines have different sizes, conventionally, different types of conventional dust couplers are prepared and are respectively mounted onto the dust outlet tubes of different woodworking machines. A size of an opening on one of two opposite ends of each conventional dust coupler is designed according to the collecting pipe, and a size of an opening on the other one of the two opposite ends of each conventional dust coupler is designed according to the dust outlet tube of the corresponding woodworking machine. Thereby, the collecting pipe can be combined with the dust outlet tubes of woodworking machines in use.

However, in the conventional way of combining the collecting pipe with the dust outlet tube, different types of conventional dust couplers need to be prepared and respectively mounted onto the dust outlet tubes of different woodworking machines. Since multiple woodworking machines are in the workspace, the woodworkers not only have to purchase multiple types of conventional dust couplers and assemble these conventional dust couplers one by one but also have to clean these conventional dust couplers regularly. Costs of the woodworking are highly increased due to purchase, assembly, and later maintenance, and cleaning of these conventional dust couplers.

To overcome the shortcomings of the conventional dust couplers, the present invention tends to provide a dust coupler adapted to different dust outlet tubes to mitigate or obviate the aforementioned problems.

SUMMARY OF THE INVENTION

The main objective of the present invention is to provide a dust coupler adapted to different dust outlet tubes that can be mounted on a collecting pipe of a collecting pipeline in a dust collection system and allow the collecting pipe to be combined with any one of different dust outlet tubes having different sizes.

The dust coupler is adapted to different dust outlet tubes, and the dust coupler has a collecting pipe connector and an elastic sheathing element. The collecting pipe connector is hollow and has a first end, a second end being opposite to the first end, and an opening. The first end is configured to be inserted into a collecting pipe of a dust collecting system for woodworking, and the opening is formed on the first end of the collecting pipe connector and communicates with an interior of the collecting pipe connector. The elastic sheathing element is connected to the second end of the collecting pipe connector, is made of an elastic material, has a mouth communicating with the interior of the collecting pipe connector, and is configured to be elastically sheathed onto a dust outlet tube of a woodworking machine.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
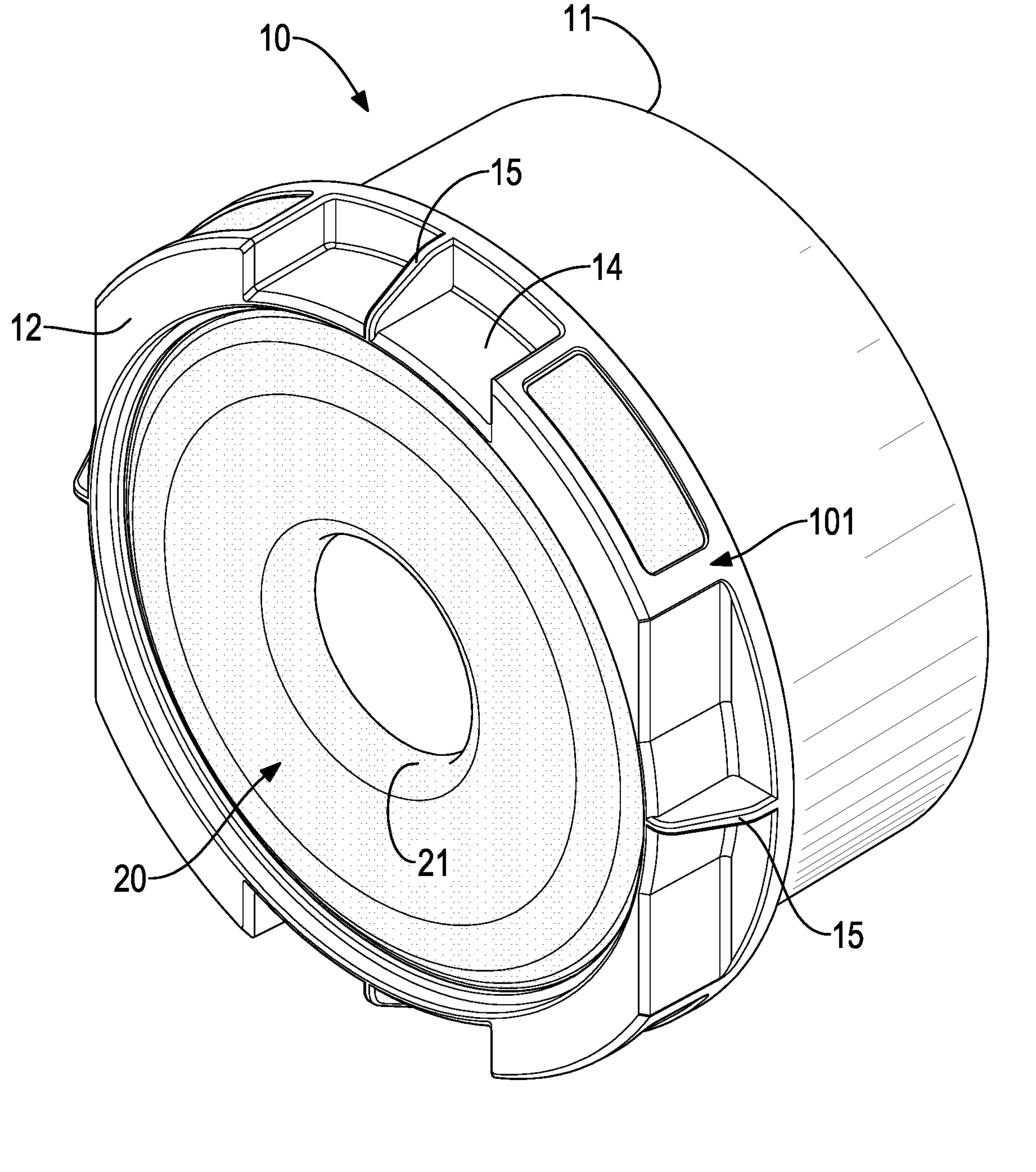
FIG. 1 is a perspective view of a dust coupler adapted to different dust outlet tubes of a preferred embodiment in accordance with the present invention.

With reference to FIG. 1, a dust coupler adapted to different dust outlet tubes of a preferred embodiment in accordance with the present invention is shown. The dust coupler has a collecting pipe connector 10 and an elastic sheathing element 20. The elastic sheathing element 20 is connected to one of two opposite ends of the collecting pipe connector 10. The dust coupler is configured to make a collecting pipe of a collecting pipeline in a dust collection system for woodworking combined with any one of dust outlet tubes respectively disposed on different woodworking machines and having different sizes.

With reference to FIGS. 1 to 4, the collecting pipe connector 10 is hollow and has an internal space 100 formed at an interior of the collecting pipe connector 10. The collecting pipe connector 10 has a first end 11, a second end 12 being opposite to the first end 11, and an opening 13. The opening 13 is formed on the first end 11 of the collecting pipe connector 10 and communicates with the internal space 100 of the collecting pipe connector 10. The elastic sheathing element 20 is connected to the second end 12 of the collecting pipe connector 10 and is made of an elastic material. The elastic sheathing element 20 has a mouth 21 communicating with the internal space 100 of the collecting pipe connector 10 and is configured to be elastically sheathed onto a dust outlet tube of a woodworking machine. Specifically, the elastic sheathing element 20 is annular; the mouth 21 is formed at a center of the elastic sheathing element 20, and an edge of the elastic sheathing element 20 is connected to the collecting pipe connector 10.

Figure 5:
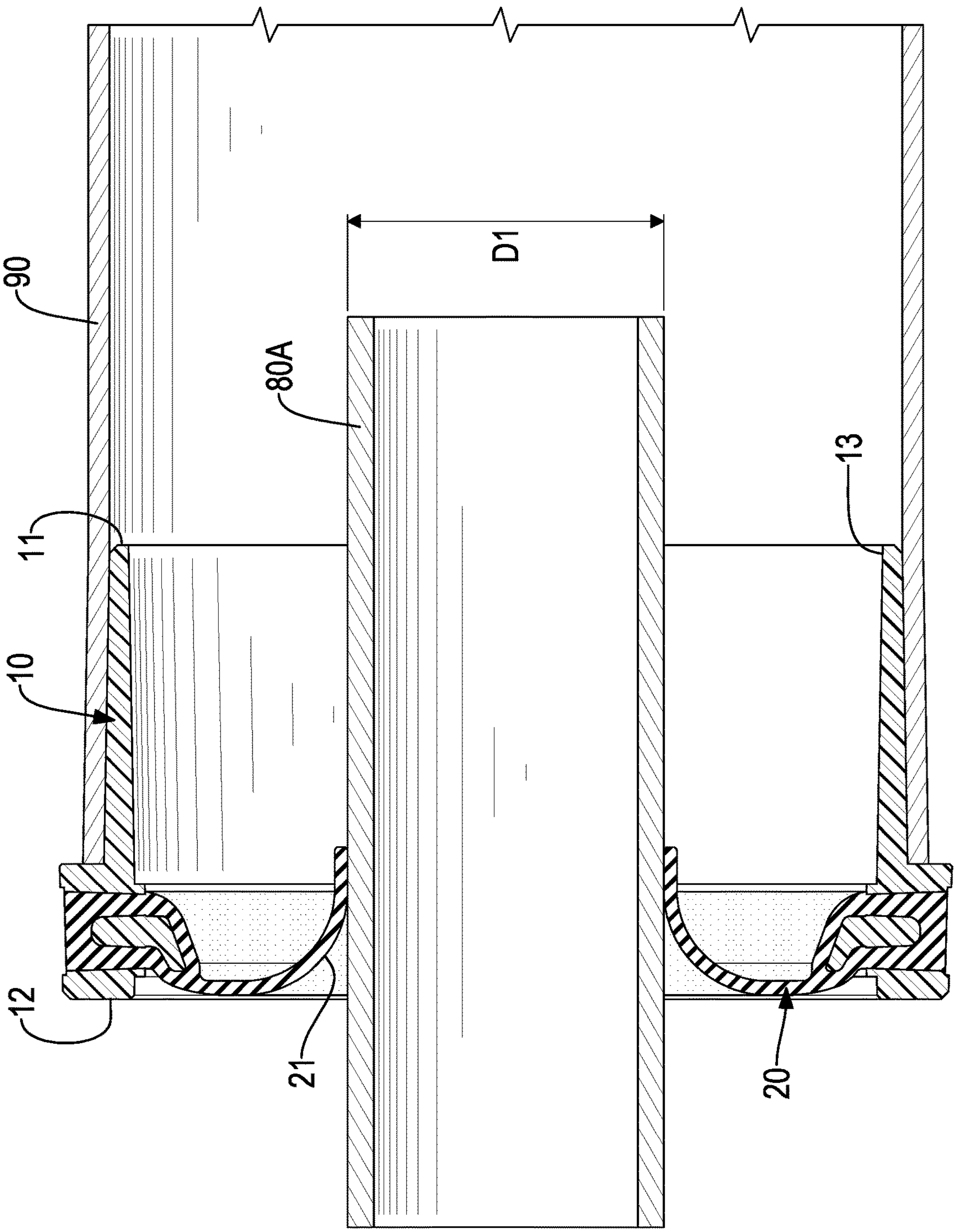
FIGS. 5 and 6 are cross-sectional side views which depict the dust coupler adapted to different dust outlet tubes in FIG. 1 combining a collecting pipe with dust outlet tubes of two different sizes.

In use, with reference to FIG. 5, the dust coupler adapted to different dust outlet tubes combines a collecting pipe 90 with a dust outlet tube 80A of a woodworking machine, and the dust outlet tube 80A has an outer diameter D1. When combining, the first end 11 of the collecting pipe connector 10 is inserted rightward into the collecting pipe 90 from the left side of FIG. 5, and the dust outlet tube 80A is inserted rightward into the mouth 21 of the elastic sheathing element 20 from the left side of FIG. 5. Since the elastic sheathing element 20 is made of the elastic material, the mouth 21 expands elastically and allows the elastic sheathing element 20 to be sheathed onto the dust outlet tube 80A. Thereby, the dust coupler adapted to different dust outlet tubes makes the collecting pipe 90 and the dust outlet tube 80A of the woodworking machine coupled with each other and makes the dust outlet tube 80A communicate with the collecting pipe 90. After the collecting pipe 90 is detached from the dust outlet tube 80A of the woodworking machine, the mouth 21 shrinks and restores to an original size via the elasticity of the elastic sheathing element 20.

Figure 6:
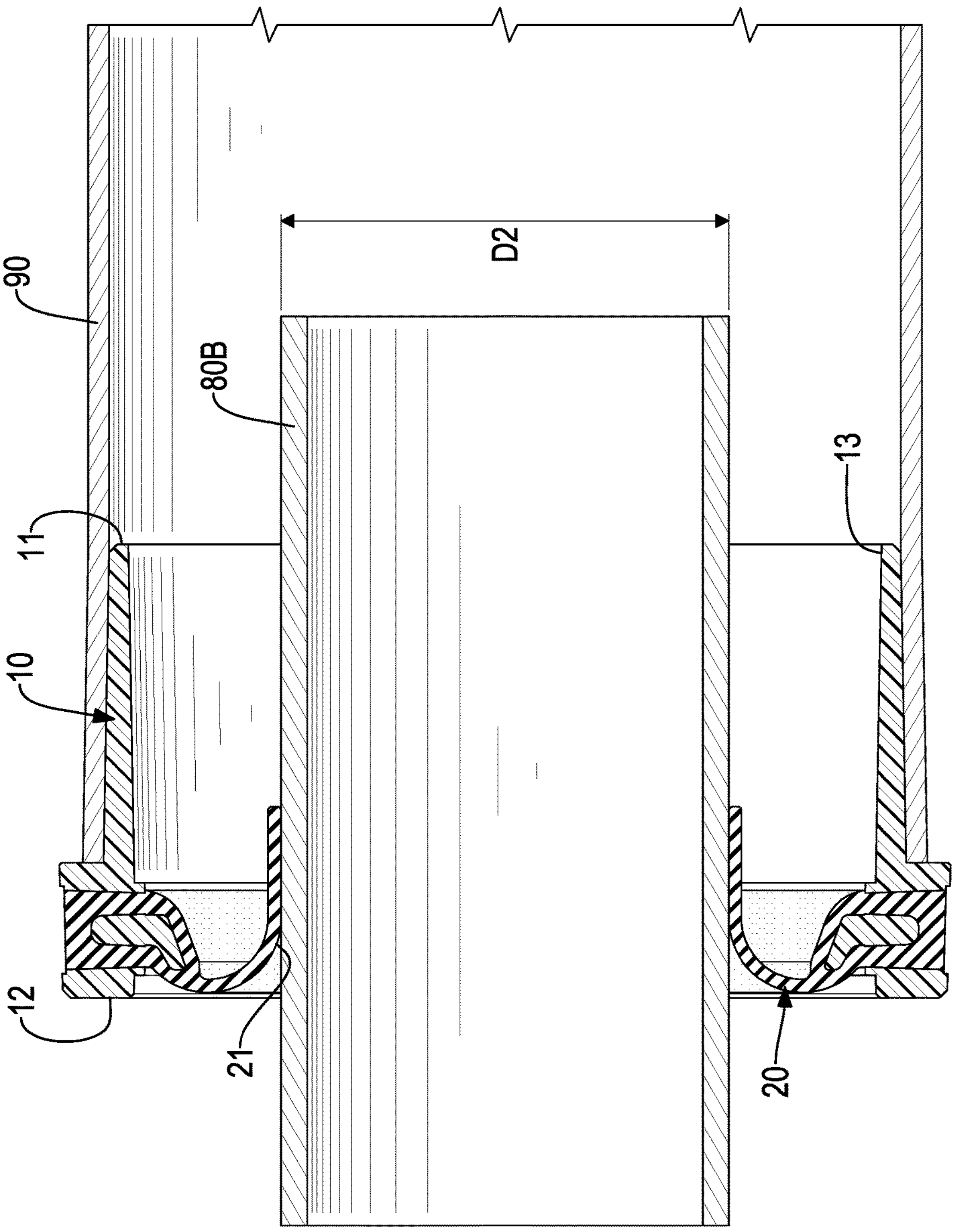

With reference to FIG. 6, the dust coupler adapted to different dust outlet tubes combines the collecting pipe 90 with a dust outlet tube 80B of another woodworking machine, and the dust outlet tube 80B of another woodworking machine has an outer diameter D2 being larger than the outer diameter DI of the dust outlet tube 80A of the above-mentioned woodworking machine. When combining, the collecting pipe connector 10 is inserted into the collecting pipe 90 as described above, and the dust outlet tube 80B of another woodworking machine is inserted rightward into the mouth 21 of the elastic sheathing element 20 from the left side of FIG. 6. Since the elastic sheathing element 20 is made of the elastic material, the mouth 21 expands elastically and allows the elastic sheathing element 20 to be sheathed onto the dust outlet tube 80B of another woodworking machine which has a larger outer diameter than the dust outlet tube 80A of the above-mentioned woodworking machine. Thereby, the dust coupler adapted to different dust outlet tubes makes the collecting pipe 90 and the dust outlet tube 80B of another woodworking machine coupled with each other and makes the dust outlet tube 80B communicate with the collecting pipe 90.

According to the description above and FIGS. 5 and 6, a woodworker can first mount the dust coupler onto the collecting pipe 90, and then the collecting pipe 90 is able to be combined with any one of dust outlet tubes of different woodworking machines with the elastic sheathing element 20 being elastically sheathed onto said dust outlet tube, which allows the collecting pipe 90 to be quickly combined with or detached from said dust outlet tube. Therefore, the woodworker needs not purchase different types of conventional dust couplers and respectively mount those conventional dust couplers onto the dust outlet tubes one by one, and the work of maintaining and cleaning the conventional dust couplers can also be saved. With the dust coupler adapted to different dust outlet tubes in accordance with the present invention, costs of woodworking can be obviously reduced.

Figure 2:
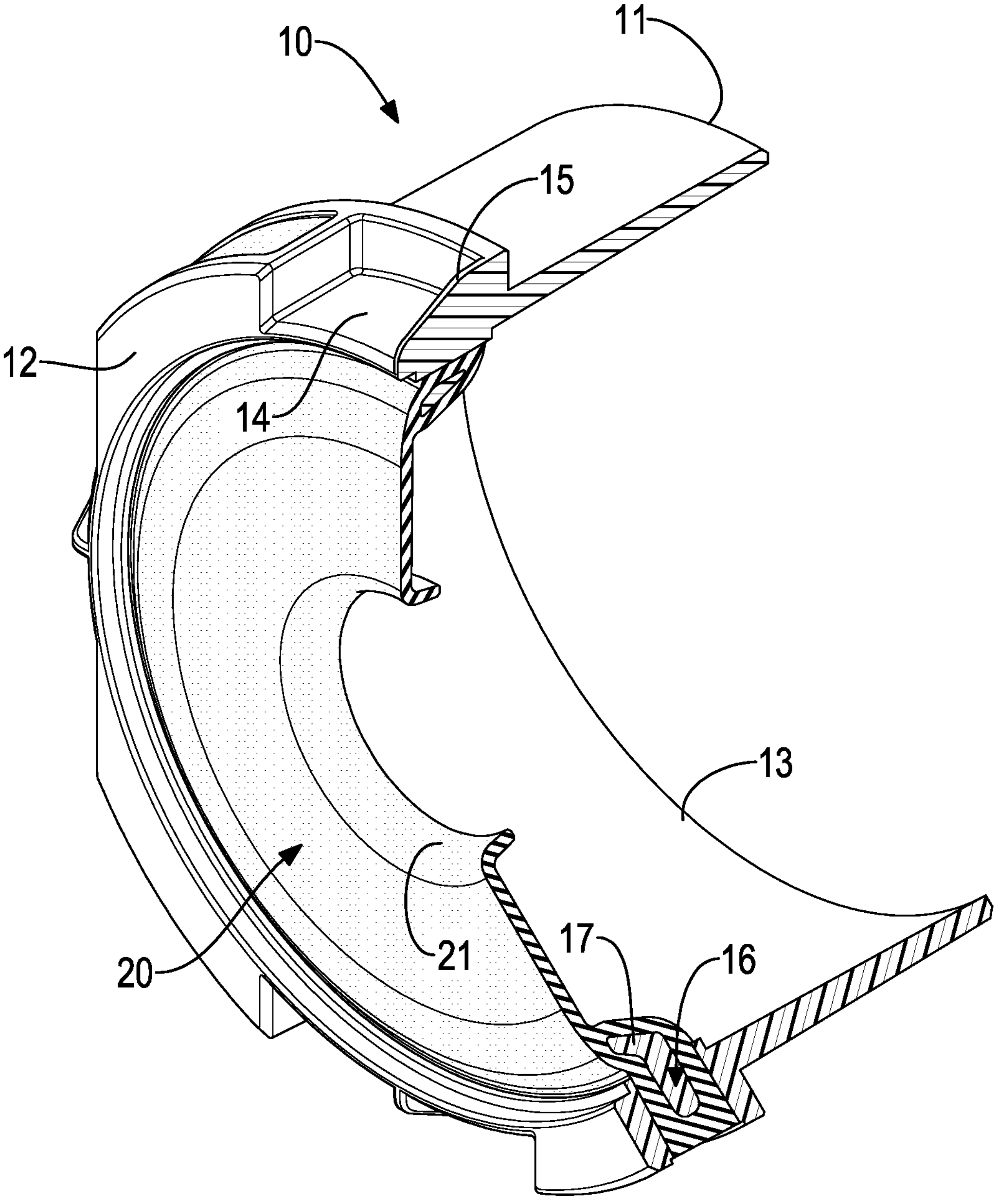
FIG. 2 is a sectional perspective view of the dust coupler adapted to different dust outlet tubes in FIG. 1.
Figure 4:
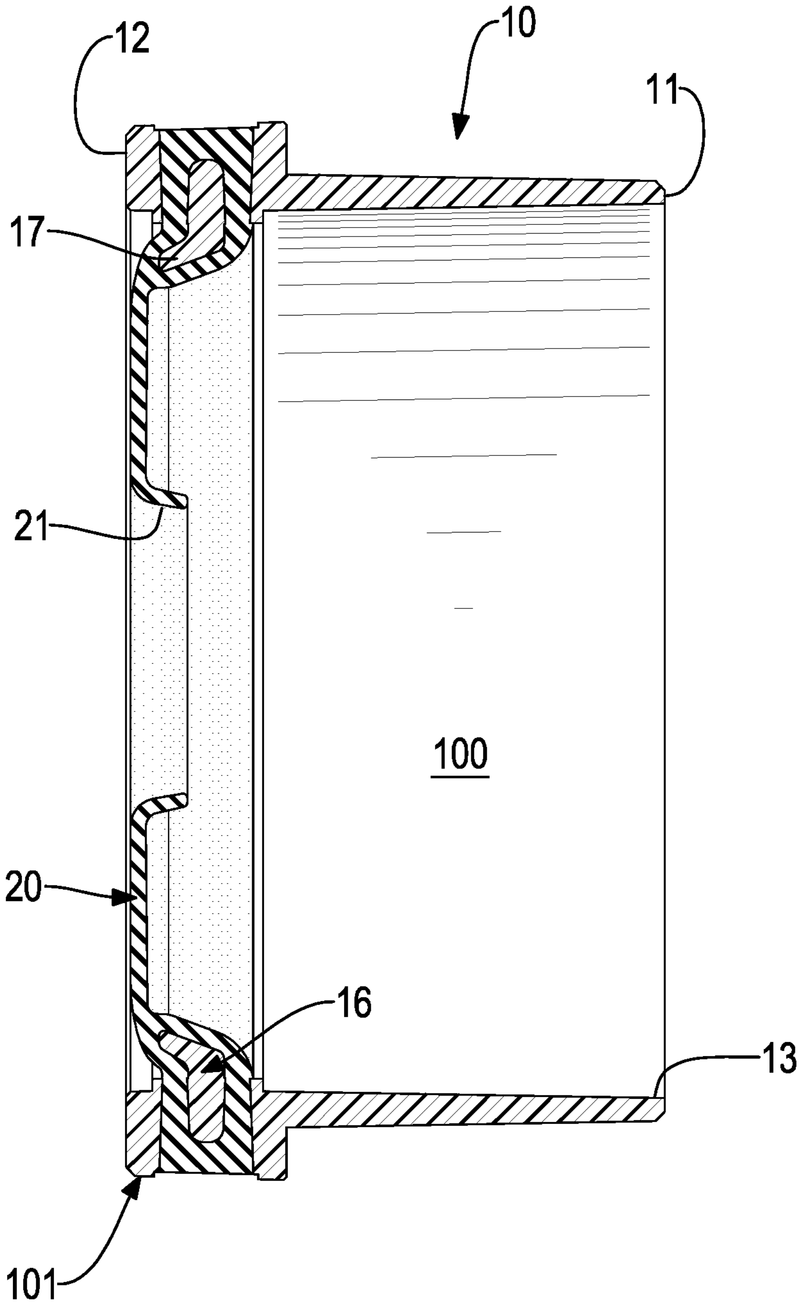
FIG. 4 is a cross-sectional side view of the dust coupler adapted to different dust outlet tubes across line 4-4 in FIG. 3.

With reference to FIGS. 2 and 4, in the preferred embodiment, a portion of the elastic sheathing element 20 surrounding the mouth 21 extends toward the first end 11 of the collecting pipe connector 10 and forms a concave construction. Thereby, when detaching the dust coupler from a dust outlet tube, the above-mentioned portion of the elastic sheathing element 20 is less likely to be turned reversely, which reduces the difficulty of detaching the dust coupler from a dust outlet tube to combine another dust outlet tube with the collecting pipe 90.

With reference to FIGS. 1 and 4, in the preferred embodiment, the collecting pipe connector 10 has a strengthening edge 101 protruding radially from the second end 12 of the collecting pipe connector 10. The strengthening edge 101 increases the thickness and the strength of the second end 12 of the collecting pipe connector 10 connected to the elastic sheathing element 20, which prevents the collecting pipe connector 10 from damage due to the elastic expansion of the mouth 21 of the elastic sheathing element 20.

Figure 3:
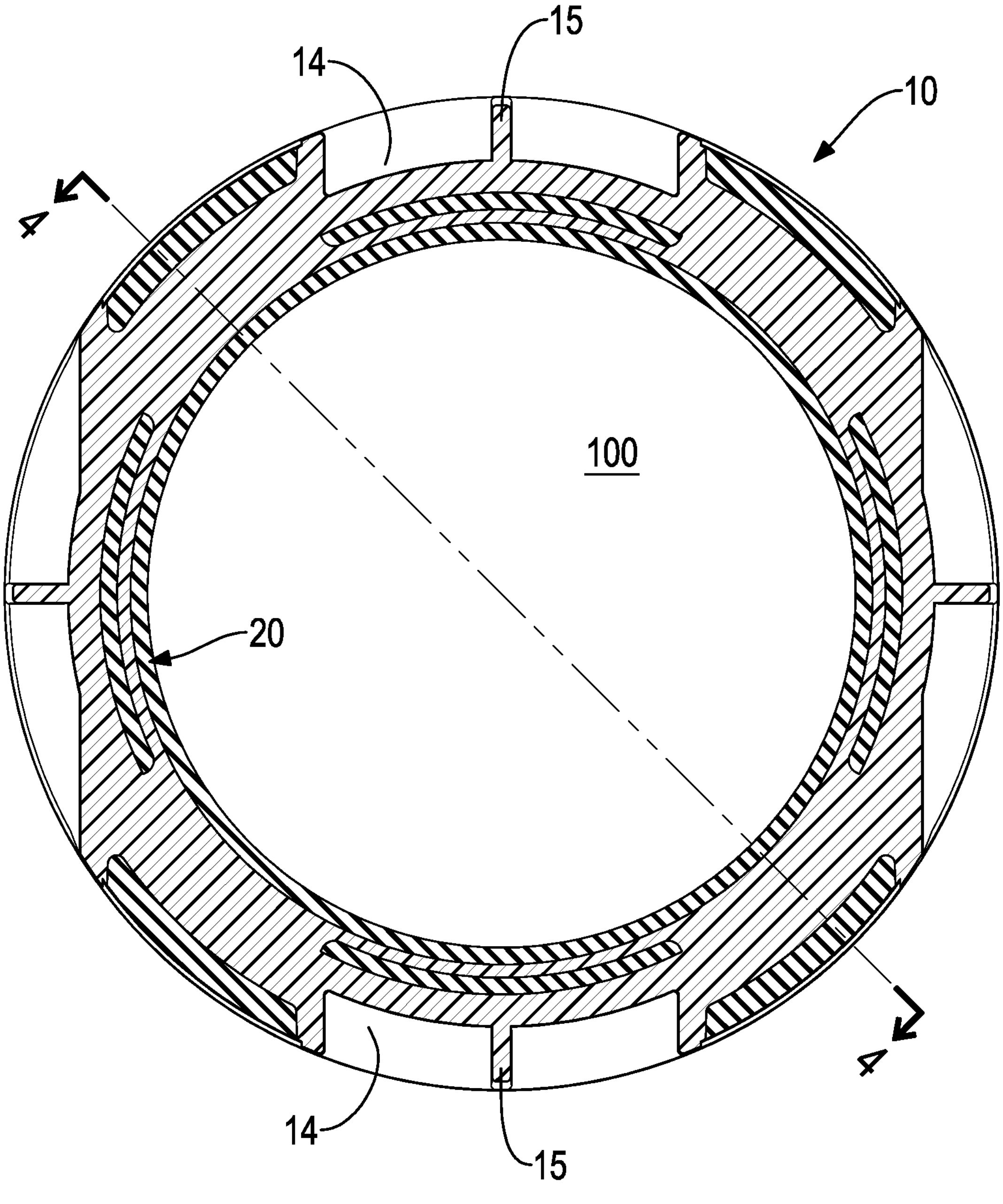
FIG. 3 is a cross-sectional side view of the dust coupler adapted to different dust outlet tubes in FIG. 1.

Moreover, with reference to FIGS. 1 to 3, the strengthening edge 101 has multiple recesses 14 and multiple ribs 15. The multiple recesses 14 are recessed from a periphery of the strengthening edge 101 toward an axis of the collecting pipe connector 10, and the multiple recesses 14 are arranged annularly. Each one of the multiple ribs 15 extends along a radial direction of the collecting pipe connector 10 from a bottom surface of a respective one of the multiple recesses 14. With the multiple recesses 14 and the multiple ribs 15, the material for producing the collecting pipe connector 10 can be reduced with the collecting pipe connector 10 maintaining a necessary structural strength, which reduces costs of production.

In the preferred embodiment, the collecting pipe connector 10 is made of a rigid plastic material, and the elastic sheathing element 20 is made of a soft and elastic plastic material; the collecting pipe connector 10 and the elastic sheathing element 20 are connected to each other via two-shot injection molding. In other embodiments, the collecting pipe connector 10 and the elastic sheathing element 20 may be connected to each other by gluing, with bolts, or by other fixing means, which is not limited by the preferred embodiment. In the preferred embodiment, the two-shot injection molding process allows the collecting pipe connector 10 and the elastic sheathing element 20 to be connected to each other during production, which saves an extra process of connecting the collecting pipe connector 10 and the elastic sheathing element 20.

With reference to FIGS. 2 and 4, in the preferred embodiment, the collecting pipe connector 10 further has at least one connecting portion 16, and the at least one connecting portion 16 is wrapped by the elastic sheathing element 20. With the wrapping construction formed by the two-shot injection molding process, the connection between the collecting pipe connector 10 and the elastic sheathing element 20 can be more stable. Compared to the connection of gluing or fixing with bolts, the elastic sheathing element 20 is less likely to be detached from the collecting pipe connector 10. The number of the at least one connecting portion 16 can be decided according to the requirement of the connection's stability between the collecting pipe connector 10 and the elastic sheathing element 20.

With reference to FIGS. 2 and 4, in the preferred embodiment, said connecting portion 16 further has a protrusion 17 protruding toward the second end 12 of the collecting pipe connector 10. While the elastic sheathing element 20 being sheathed onto a dust outlet tube, the dust outlet tube applies a pushing force on the elastic sheathing element 20, which pushes the elastic sheathing element 20 toward the first end 11 of the collecting pipe connector 10. At the time, the protrusion 17 of said connecting portion 16 wrapped by the elastic sheathing element 20 is able to resist the elastic sheathing element 20. Therefore, excessive deformation of the elastic sheathing element 20 can be avoided, which prevents the elastic sheathing element 20 from permanent deformation, being unable to restore completely, and losing its efficacy.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A dust coupler adapted to different dust outlet tubes, the dust coupler comprising:

a collecting pipe connector being hollow and having a first end configured to be inserted into a collecting pipe of a dust collection system for woodworking;

a second end being opposite to the first end; and an opening formed on the first end of the collecting pipe connector and communicating with an interior of the collecting pipe connector; and an elastic sheathing element connected to the second end of the collecting pipe connector, made of an elastic material, and having a mouth communicating with the interior of the collecting pipe connector, and configured to be elastically sheathed onto a dust outlet tube of a woodworking machine, wherein the elastic sheathing element is a thin layer; and the mouth is a hole defined through a middle of the elastic sheathing element and configured to expand and contract radially as the elastic sheathing element deforms elastically.

2. The dust coupler adapted to different dust outlet tubes as claimed in claim 1, wherein a portion of the elastic sheathing element surrounding the mouth extends toward the first end of the collecting pipe connector.

3. The dust coupler adapted to different dust outlet tubes as claimed in claim 1, wherein the collecting pipe connector and the elastic sheathing element are connected to each other via two-shot injection molding.

4. The dust coupler adapted to different dust outlet tubes as claimed in claim 2, wherein the collecting pipe connector and the elastic sheathing element are connected to each other via two-shot injection molding.

5. The dust coupler adapted to different dust outlet tubes as claimed in claim 3, wherein the collecting pipe connector has a connecting portion wrapped by the elastic sheathing element.

6. The dust coupler adapted to different dust outlet tubes as claimed in claim 4, wherein the collecting pipe connector has a connecting portion wrapped by the elastic sheathing element.

7. The dust coupler adapted to different dust outlet tubes as claimed in claim 5, wherein the connecting portion has a protrusion protruding toward the second end of the collecting pipe connector.

8. The dust coupler adapted to different dust outlet tubes as claimed in claim 6, wherein the connecting portion has a protrusion protruding toward the second end of the collecting pipe connector.

9. The dust coupler adapted to different dust outlet tubes as claimed in claim 1, wherein the collecting pipe connector has a strengthening edge protruding radially from the second end of the collecting pipe connector.

10. The dust coupler adapted to different dust outlet tubes as claimed in claim 2, wherein the collecting pipe connector has a strengthening edge protruding radially from the second end of the collecting pipe connector.

11. The dust coupler adapted to different dust outlet tubes as claimed in claim 9, wherein the strengthening edge has multiple recesses and multiple ribs;

the multiple recesses are recessed from a periphery of the strengthening edge toward an axis of the collecting pipe connector and are arranged annularly; and each one of the multiple ribs extends from a bottom surface of a respective one of the multiple recesses.

12. The dust coupler adapted to different dust outlet tubes as claimed in claim 10, wherein the strengthening edge has multiple recesses and multiple ribs;

the multiple recesses are recessed from a periphery of the strengthening edge toward an axis of the collecting pipe connector and are arranged annularly; and each one of the multiple ribs extends from a bottom surface of a respective one of the multiple recesses.

* * * * *